United States Patent [19]

Meyers

[11] Patent Number: 4,759,036

[45] Date of Patent: Jul. 19, 1988

[54] DECISION-DIRECTED CONTROL CIRCUIT

[75] Inventor: Martin H. Meyers, Lancaster, Mass.

[73] Assignees: American Telephone and Telegraph Company, New York, N.Y.; Bell Telephone Laboratories, Incorporated, Murray Hill, N.J.

[21] Appl. No.: 20,870

[22] Filed: Mar. 2, 1987

[51] Int. Cl.$^4$ .......................... H04B 7/10; H04B 3/14
[52] U.S. Cl. ........................................ 375/14; 375/97; 342/362; 455/60
[58] Field of Search .................. 375/11, 12, 14, 76, 375/97, 106, 16; 455/60, 242; 370/6, 20; 371/6, 55, 57; 364/151, 153, 155, 720, 813; 328/115; 318/620, 624; 342/361, 362

[56] References Cited

U.S. PATENT DOCUMENTS

| | | | |
|---|---|---|---|
| 3,323,066 | 5/1967 | Kurtz | 455/242 |
| 3,466,430 | 9/1969 | Hardaway | 364/155 |
| 4,300,080 | 11/1981 | Lee | 318/624 |
| 4,343,041 | 8/1982 | Forney, Jr. | 375/14 |
| 4,403,346 | 9/1983 | Ogawa | 455/242 |
| 4,513,782 | 4/1985 | Contartese et al. | 318/624 |
| 4,606,054 | 8/1986 | Amitay et al. | 455/60 |
| 4,608,703 | 8/1986 | Kaga et al. | 375/13 |
| 4,648,100 | 3/1987 | Mardirosian | 375/86 |
| 4,656,644 | 4/1987 | Ozaki | 371/57 |
| 4,709,374 | 11/1987 | Farrow | 375/13 |

Primary Examiner—Benedict V. Safourek
Attorney, Agent, or Firm—David R. Padnes

[57] ABSTRACT

An improved decision-directed control circuit is disclosed which supplies adjustments to adaptive circuitry in a communications system. The improvement is achieved by only supplying adjustments when there is a high probability that the adjustment is correct. In the disclosed embodiments, this high probability equates, at a minimum, to times when the adaptive circuit output has an amplitude which lies outside of a range extending from the largest to the smallest value of the digital signal. This adjustment approach can be used to adjust a variety of adaptive circuits including transversal equalizers, timing recovery circuits, cross-polarization cancellers and carrier recovery circuits.

28 Claims, 6 Drawing Sheets

DECISION-DIRECTED CONTROL CIRCUIT

TECHNICAL FIELD

The invention relates to decision-directed control circuits for digital signal receivers.

BACKGROUND OF THE INVENTION

Digital receivers use adaptive circuits, such as equalizers, timing and carrier recovery circuits, cross-polarization cancellers, etc., in the regeneration of an incoming data signal. To compensate for changes in the transmission channel and thereby reduce errors in regenerated signals, the adaptive circuitry is oftentimes adjusted by a decision-directed contol circuit. This control circuit provides the appropriate adjustments in response to a derived error signal and other signals in the receiver. The term "decision-directed" denotes the fact that the adjustments provided are affected by decisions made as to the value of the regenerated data signal.

A characteristic of decision-directed control circuits is that their performance is seriously degraded or fails entirely when the regenerated data signal contains a high error rate. This occurs in digital radio transmission, for example, when atmospheric disturbances result in a high error rate and the loss of receiver synchronization. It is known that the operation of a decision-directed control circuit for adjusting a carrier recovery circuit can be made more immune to the effects of high error rates by defining predicted signal value ranges. Examples of such approaches are described in U.S. Pat. Nos. 4,057,762, issued Nov. 8, 1977, to Namiki and in 4,283,682, issued Aug. 11, 1981, to Sifford et al., and U.S. Pat. application Ser. No. 717,288, filed Mar. 28, 1985, in the name of J. Mardirosian and assigned to the same assignee as the present invention. While these disclosed techniques improve the operation of adaptive carrier recovery circuitry in certain system applications, still further improvements are necessary to meet the performance objectives of other system applications. In addition, a technique which would improve the decision-directed control of other adaptive circuitry, such as equalizers, cross-pol cancellers and timing recovery circuitry would be desirable.

SUMMARY OF THE INVENTION

In accordance with the present invention, a decision-directed control circuit provides adjustments to adaptive circuitry which processes at least one digital signal, if there is a high probability that each alteration is correct. If this probability is not met, no adjustment is provided. To satisfy this requirement in one embodiment of the invention, adjustments are provided only if the amplitude of the adaptive circuit output lies outside of the aforesaid range at first times and this signal or other associated signal lies outside of a range extending from the largest to the smallest permissible digital signal value. In another embodiment, adjustments are provided only if the amplitude of the adaptive circuit output signal lies outside of a predetermined subset of the aforesaid range at second times. Advantageously, this approach overcomes the limitations of the prior art and can be used to adjust a variety of adaptive circuits, including transversal equalizers, timing recovery circuits, cross-polarization cancellers and carrier recovery circuits.

DETAILED DESCRIPTION

Figure 1:
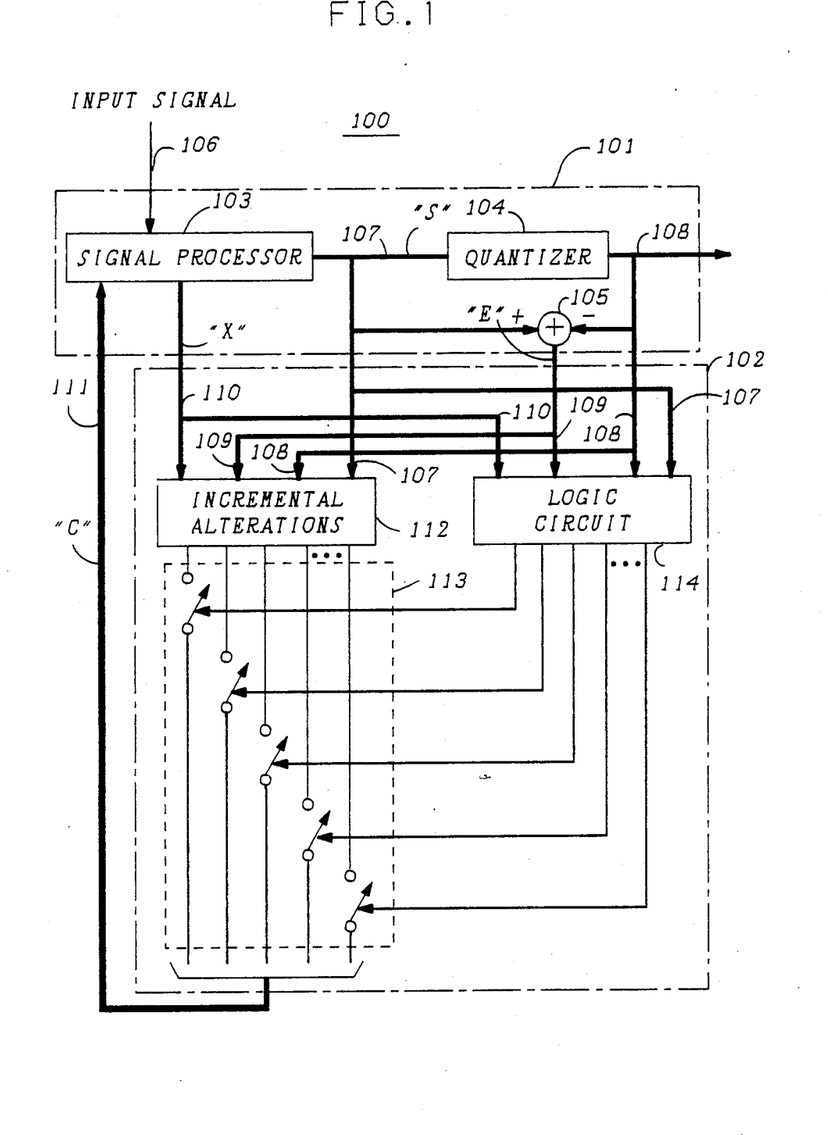
FIG. 1 is a schematic-block diagram of an illustrative decision-directed control circuit in accordance with the present invention.

FIG. 1 shows an illustrative decision-directed control circuit 100, in accordance with the present invention, comprising a receiver 101 and a controller 102. Receiver 101 includes signal processor 103, quantizer 104 and summer 105. An information-bearing signal is coupled to receiver 101 via lead 106. This input signal can either be real or complex-valued. A real-valued signal corresponds to a single digital information signal, such as used in communications systems utilizing baseband pulse amplitude modulation. A complex-valued signal corresponds to two digital information signals, such as in communications systems utilizing quadrature amplitude modulation.

Signal processor 103 includes one or more well-known adaptive circuits which provide a variety of functions including distortion compensating, timing, and carrier recovery, the latter being used when a modulated passband carrier signal is transmitted. The output signal from signal processor 103 is coupled on bus 107 to quantizer 104. Quantizer 104 assigns the processor output signal on bus 107 to the closest one of a plurality of thresholds. Each threshold corresponds to a different one of the permissible transmitted digital signal levels. The assigned threshold value, representing the estimated received signal value, appears on bus 108 and is coupled to other signal processing circuitry (not shown) and to controller 102.

Summer 105 forms an error signal "E" on bus 109 which is equal to the processor output signal "S" on bus 107 minus the assigned threshold value on bus 108. Error signal E is an estimate of the true error signal; the true error signal being equal to the algebraic difference between the signal on bus 107 and the actual, corresponding transmitted digital signal level. Error signal E includes one or more bits, with one bit representing the polarity of the difference formed by summer 105. Signal processor 103 may also provide other information, denoted by signal "X" on bus 110, to controller 102.

Controller 102, comprising incremental alterations circuit 112, switch 113 and logic circuit 114, generates one or more control signals C on bus 111 which are supplied to processor 103 to improve the operation of the adaptive circuitry therein. For purposes of illustration, we shall assume that such adaptive circuitry is directly connected to the output bus 107 but is not directly connected to the input signal on lead 106. The control signals on bus 111 can provide a variety of adjustments. For example, these control signals can supply incremental changes to the tap-weight coefficients in a transversal equalizer or can provide incremental phase adjustments to timing or carrier recovery circuitry. The generation of these control signals is in accordance with any of a number of well-known algorithms, such as zero forcing wherein each control signal C is a function of error signal E and processor output signal S, or least mean square wherein each control signal C is a function of error signal E and the input signal to the adaptive circuit, the latter being represented by the signal X on bus 110. Of course, the present invention is not limited to least mean square or zero forcing and other algorithms, including variants of the aforementioned two algorithms, can be used. In any event, pursuant to the present invention, controller 102 alters the operation of the adaptive circuitry in receiver 101 only when there is a high probability that each alteration is 'correct'. If this probability is not met, no alteration is provided. In one embodiment of the present invention, a high probability that an alteration is correct requires a high probability that the polarity of the error signal E is correct. In another embodiment of the present invention, a high probability that an alteration is correct requires that there is a high probability that the polarity of the error signal E and the polarity of an output signal from the adaptive circuit in signal processor 103 to be adjusted are correct. In still another embodiment of the present invention, high probability of an alteration being correct means that there is a high probability that the polarity of the error signal E and the polarity of an input signal to an adaptive circuit to be adjusted in signal processor 103 are correct.

Incremental alterations circuit 112, in a well-known manner, generates each control signal in accordance with a predetermined one of the above-referenced algorithms. These control signals are generated in response to the signals on buses 107, 108, 109 and 110 with the particular signals utilized, e.g., those on bus 107 or 110, depending on the algorithm used. Typically, each of these control signals adjusts a different element in an adaptive circuit. Each control signal is coupled through a different pole of switch 113 wherein each switch pole is controlled by an associated switch toggle signal generated by logic circuit 114 in response to the signals on buses 107–110.

Figure 2:
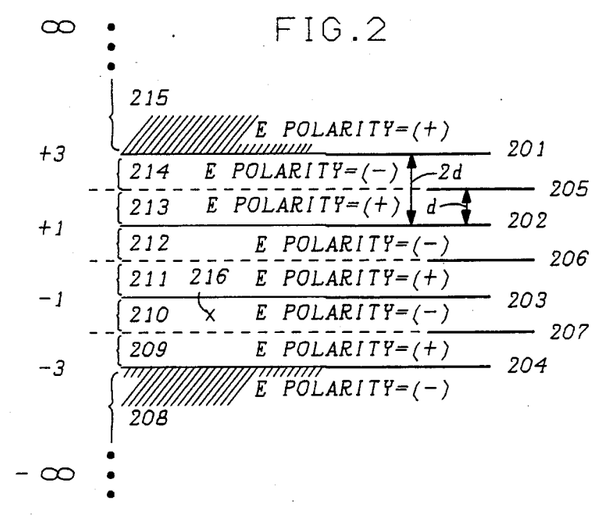
FIG. 2 is a diagram of illustrative threshold values which illustrate the operation of the decision-directed control circuit pursuant to the present invention.

To understand how the alterations of the adaptive circuitry in signal processor 103 are limited to those which have a high probability of being correct, refer now to FIG. 2. FIG. 2 shows the 4 permissible transmitted digital signal levels 201, 202, 203, 204 of an illustrative input signal on lead 106 of FIG. 1. These signal levels are respectively +3, +1, −1 and −3 volts. The distance between adjacent signal levels is denoted by 2d. Decision thresholds 205, 206 and 207 are disposed midway between adjacent signal levels and, accordingly, the distance between any decision threshold and either of its adjacent signal levels is d. The signal S on bus 107 of FIG. 1 can fall in any of the regions 208–215 and this signal has a positive polarity if it lies in regions 212–215 and a negative polarity if it lies in regions 208–211. FIG. 2 also indicates the polarity of the error signal E on bus 109 in FIG. 1 for each region. As discussed, quantizer 104 assigns the signal on bus 107 to the closest one of the permissible transmitted digital signal levels. Therefore, if the signal on bus 107 lies above signal level 202 and below threshold 205, the signal is assigned the +1 value of signal level 202 and the polarity of the error signal E is positive (+) since the signal processor output signal was above the assigned signal level.

The quality or correctness of the control signals C on bus 111 depends on the correctness of the parameters used to generate these control signals. Furthermore, the dominate degradation in the operation of the illustrative decision-directed control circuit of FIG. 1 occurs when the incremental adjustments provided are of the wrong polarity, i.e., they adjust the adaptive circuitry in the wrong direction. Accordingly, we propose to adjust adaptive circuitry only when there is a high probability that the adjustment is in the correct direction. It has been found that the most likely adjustment errors are caused by small degradations in the communications channel. Furthermore, the most likely adjustment errors arise when the signal on bus 107 and the transmitted signal lie on opposite sides of one decision threshold. Such events always result in an error in the polarity of the error signal and sometimes result in an error in the regenerated signal polarity. For example, referring to FIG. 2, assume that a −3 volt signal was transmitted and the signal on bus 107 falls at point 216. The receiver will assign this signal a −1 value and the polarity of the error signal is negative. Consequently, if control signal C is based on a correlation of the error signal and the assigned signal level, the adjsutment would be in the positive direction since the polarities of the error signal and the assigned signal level are both negative. The correct adjustment, however, should be in the negative direction, as the polarity of the true signal level is negative and the polarity of the true error signal is positive. As a result, the adjustment produced by control signal C is in the wrong direction due to an incorrect decision for the error signal polarity.

The operation of the adaptive circuits in signal processor 103 can be significantly improved if adjustments to these circuits are only provided when the polarity of the error signal is known to be correct. This is so when the signal on bus 107 lies in regions 208 or 215 which respectively extend from −3 to infinity and from +3 to infinity. In such events, the error signal polarity will be correct regardless of the signal level transmitted and even if the assigned signal level is incorrect. For example, if a +1 valued signal is transmitted and the signal on bus 107 falls in region 215, an incorrect signal level of +3 is assigned but the correct positive error signal polarity is determined. A similar argument holds for a signal on bus 107 lying in region 208. Therefore, by altering or updating the operation of adaptive circuitry in signal processor 103 only when the signal on bus 107 lies outside of the range extending between the largest and smallest permissible signal levels, i.e., in regions 208 and 215, we significantly reduce the likelihood of incorrect adjustments due to noise or other degradations.

Refer now to FIGS. 1 and 2. In accordance with one embodiment of the present invention, logic circuit 114 provides switch toggle signals which close switch 113 only when the signal on bus 107 lies in regions 208 or 215 of FIG. 2. This determination can be easily made from an examination of the polarity of the error signal on bus 109 and the value of the assigned signal level on bus 108.

Further improvements in adaptive circuit operation are also possible. Consider the case where an adjustment to the adaptive circuitry in signal processor 103 is based on a correlation of the error signal at one time and the signal level of bus 107 at another time. Such is the case for the adjustment of certain tap-weight coefficients in a transversal equalizer pursuant to the zero forcing algorithm. An error in the direction of the adjustment provided by any control signal C will occur when either the polarity of the error signal at one time or the polarity of the signal level on bus 107 at the associated time is incorrect. The previous discussion relative to FIG. 2 focussed on reducing errors in the error signal polarity. Now, we will focus on improving the correctness of the polarity of the signal level on bus 107. Errors in the polarity of the signal level on bus 107 will occur when the transmitted signal and the signal on bus 107 lie on different sides of threshold 206. Moreover, the most likely errors occur when the distance separating the transmitted signal and the signal on bus 107 is slighter greater than d. Consequently, further improvements in adaptive circuit operation can be achieved when an adjustment is based on correlations of the error signal at a first time and the signal on bus 107 at a second time if we only provide an adjustment when the signal on bus 107 at the first time lies in regions 208 or 215 and the signal on bus 107 at the second time is not near threshold 206. One example of nearness might be signals lying in either regions 211 or 212. Of course, other definitions of nearness can be contemplated and such definitions may vary with the adaptive circuit to be adjusted or with the system application. Accordingly, for such correlations, logic circuit 114 would only close the associated switch toggle when the signal on bus 107 at the first time lies in regions 208 or 215 and this signal at the second time lies outside of regions 211 and 212, i.e., within regions 208-210 or 213-215. Thus switch control can be readily provided from an examination of the signals on buses 107, 108 and 109. Similarly, in other applications, e.g., least mean square wherein an adjustment is based on correlations of the error signal at a first time and the input signal to the adaptive circuit at a second time, further improvements in adaptive circuit operation can be gained if adjustments are inhibited unless the signal on bus 107 at the first time lies in regions 208 or 215 and the signal on bus 110 at the second time lies outside of regions 211 and 212.

Figure 3:
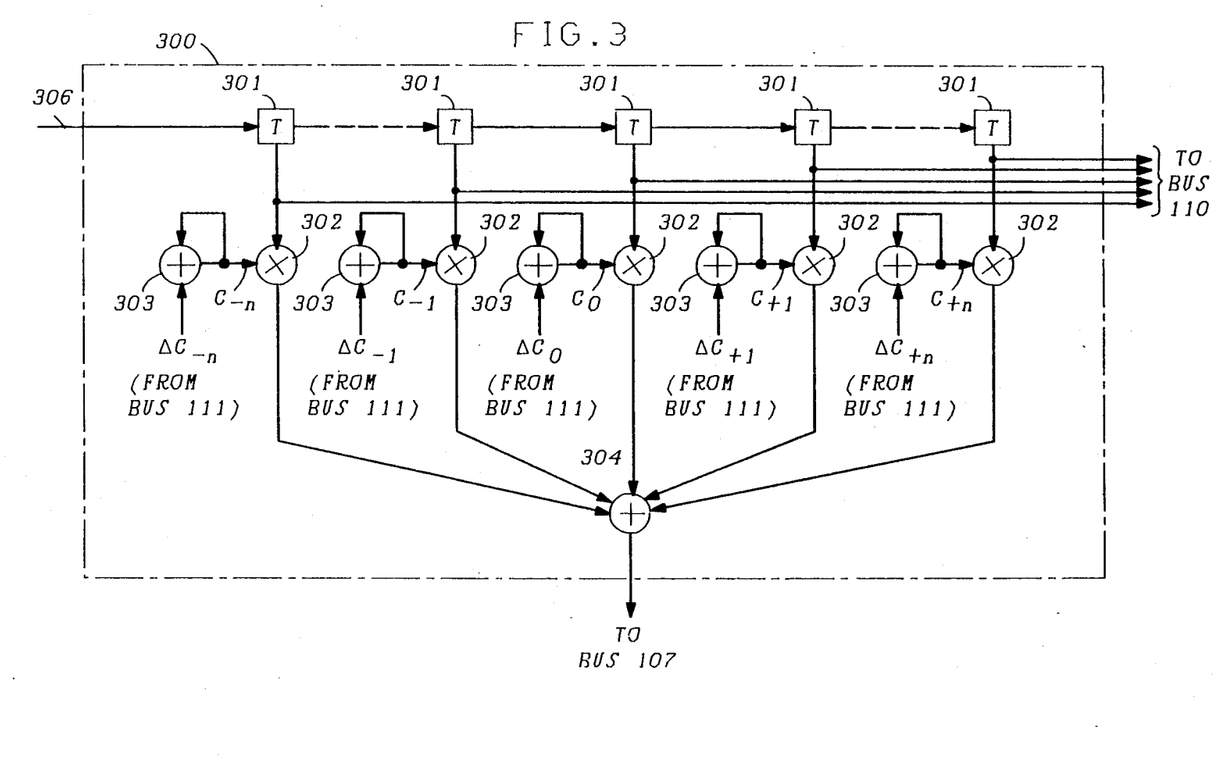
FIG. 3 is a schematic diagram of one arrangement of signal processor 103 of FIG. 1 which includes an adaptive transversal equalizer.

FIG. 3 shows an illustrative adaptive transversal equalizer 300 which can be adjusted in accordance with the present invention, to provide distortion compensation for a digital signal on lead 306. This signal, for purposes of discussion, is derived from the input signal on lead 106 of FIG. 1. Equalizer 300, located within signal processor 103, comprises a tapped delay line having $2n+1$ delay elements 301, where n is any positive integer including zero, a plurality of multipliers 302 and a summer 304. The delay elements 301 each provide a baud interval delay T. Of course, fractional baud interval delays could also be provided. Each multiplier 302, connected to a different tap, forms the product of the digital signal at the tap and an associated tap-weight coefficient $C_i$, where i is the tap index and i varies from $-n$ to $+n$. Each of these products is summed by summer 304 and coupled to bus 107. The tap-weight coefficients are periodically updated and the incremental coefficient change, $\Delta C_i$, for any coefficient is coupled from an associated lead of bus 111 and added to the previous coefficient value via a summer 303. The incremental coefficient changes $\Delta C_i$, according to the least mean square algorithm, can be expressed as:

$$\Delta C_i^K = -\bar{a} E_K X_i; \tag{1}$$

where
  K is the time of adjustment;
  $E_K$ is the error signal on bus 109 at the time of adjustment;
  $X_i$ is the digital signal at the $i^{th}$ tap;
  and a is a predetermined scaling factor.

In accordance with one embodiment of the present invention, such updates are only supplied, via switch 113, when $E_K$ is formed from a signal on bus 107 of FIG. 1 lying in regions 208 or 215 of FIG. 2. Or, pursuant to another embodiment, each incremental coefficient change is only supplied when $E_K$ is formed from a signal on bus 107 lying in regions 208 or 215 and $X_i$ on bus 110 of FIG. 1 lies remote from threshold 206, e.g., outside of regions 211 and 212.

The above two embodiments can also be applied to update the tap-weight coefficient using a zero forcing algorithm expressed by:

$$\Delta C_i^K = -\bar{a} \text{Sgn}(A_{K-i}) \text{Sgn}(E_K); \tag{2}$$

where
  K is the time of adjustment;
  $\text{Sgn}(E_K)$ is the algebraic sign of the error signal on bus 109 at the time of adjustment;
  $\text{Sgn}(A_{K-i})$ is the algebraic sign of the signal on bus 108 at the $i^{th}$ baud interval prior to the time of adjustment;
  and a is a predetermined scaling factor.

With equation (2), logic circuit 114 of FIG. 1 would examine the signals on buses 108 and 109 and close the switch pole associated with tap-weight coefficient $C_i$ when $E_K$ lies in region 208 or 215 or, alternatively, logic circuit 114 examines the signals on bus 107-109 closes switch 113 only when $E_K$ lies in regions 208 or 215 and $A_{K-i}$ lies outside of region 211 and 212.

Figure 4:
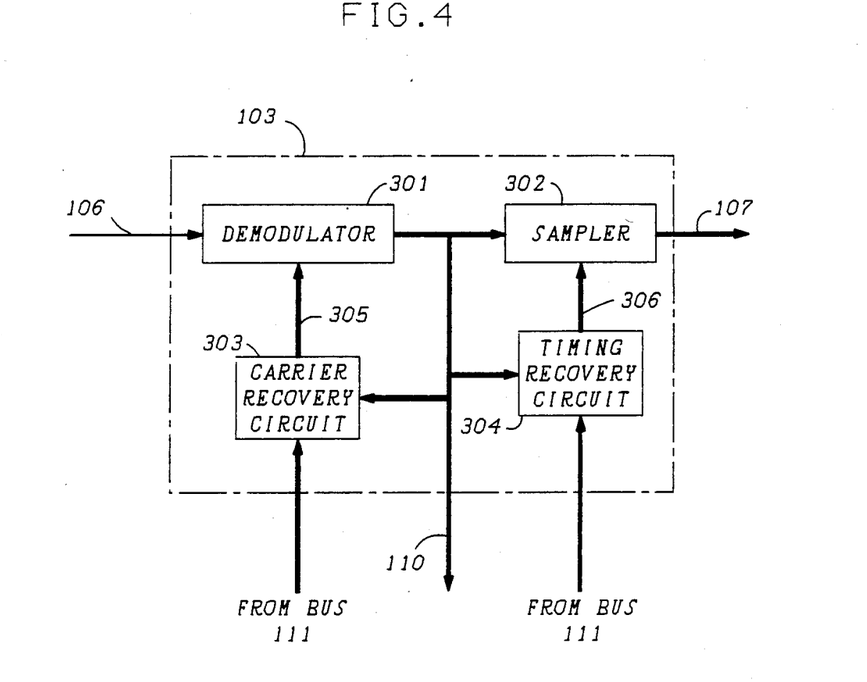
FIG. 4 is a schematic diagram of another arrangement of signal processor 103 of FIG. 1 which includes adaptive timing and carrier recovery circuitry.

Refer now to FIG. 4 which shows an arrangement of signal processor 103 which includes adaptive timing and carrier recovery circuitry. The information signal on lead 106 in this arrangement is a signal comprising a pair of amplitude modulated, quadrature-related carrier signals which are coupled to demodulator 301. This demodulator, in well-known fashion, extracts a pair of pulse amplitude modulated signals, commonly designated as I and Q, from these modulated carrier signals. This process requires the use of a pair of reference quadrature-related carrier signals supplied by carrier recovery circuit 303 on bus 305. Signals I and Q are coupled to sampler 302, carrier recovery circuit 303 and timing recovery circuit 304. For purposes of simplicity, we will assume each I and Q signal conveys information on 4 digital signal levels and these signal levels are $+3$, $+1$, $-1$ and $-3$ volts. To recover this information, sampler 302 strobes the I and Q signals at appropriate sampling times provided on bus 306 by timing recovery circuit 304. The resulting samples are coupled to bus 107.

To provide coherent demodulation, phase alignment between the modulated and reference carrier signals must be established and maintained. Carrier recovery circuit 303 provides the requisite phase alignment in response to phase error signals on bus 111 generated by incremental alteration circuit 112 of FIG. 1. Such alterations can be generated by known algorithms, such as least mean square or zero forcing. With the zero forcing algorith, the phase adjustment signal at the $K^{th}$ adjustment time, where K is any integer, can be expressed as:

$$\text{phase adjustment signal} = \alpha[E_{K,I}S_{K,Q} - E_{K,Q}S_{K,I}]; \quad (3)$$

where

α is a scaling factor;

$E_{K,I}$ and $E_{K,Q}$ respectively are the error signals associated with the I and Q signals at the $K^{th}$ adjustment time; and $S_{K,I}$ and $S_{K,Q}$ respectively are the I and Q signals appearing across bus 107 at the $K^{th}$ adjustment time.

With equation (3), logic circuit 114 of FIG. 1 examines the signals on buses 108 and 109 and closes switch 113 only when $E_{K,I}$ and/or $E_{K,Q}$ lie in regions 208 or 215 for the associated information signal. Specifically, when $E_{K,I}$ and $E_{K,Q}$ each lie in regions 208 or 215, switch 113 couples a phase adjustment signal as expressed by equation (3). If, however, only $E_{K,I}$ or $E_{K,Q}$ lies in regions 208 or 215, then switch 113 couples a phase adjustment signal equal to the first term, $\alpha E_{K,I}S_{K,Q}$, or the second term $-\alpha E_{K,Q}S_{K,I}$, respectively. Alternatively, logic circuit 114 examines the signals on buses 107, 108 and 109 and closes switch 113 only when $E_{K,I}$ and/or $E_{K,Q}$ lie in regions 208 or 215 and $S_{K,I}$ and/or $S_{K,Q}$ lie outside of regions 211 and 212. With this alternate arrangement, the phase error signal is equal to equation (3) or only the first term, $\alpha E_{K,I}S_{K,Q}$, or only the second term, $-\alpha E_{K,Q}S_{K,I}$, depending on the values of $E_{K,I}$, $E_{K,Q}$, and $S_{K,I}S_{K,Q}$. For example, the phase error signal would be expressed by equation (3) when $E_{K,I}$ and $E_{K,Q}$ each lie in regions 208 or 215 and $S_{K,I}$ and $S_{K,Q}$ each lie outside of regions 211 and 212. If, however, $E_{K,I}$ lies in regions 208 or 215 and $E_{K,Q}$ does not, and $S_{K,Q}$ lies outside of regions 211 and 212 and $S_{K,I}$ does not, the phase error signal coupled is equal to $\alpha E_{K,I}S_{K,Q}$. Or, when $E_{K,Q}$ lies outside of regions 208 or 215 and $S_{K,I}$ lies outside of regions 211 and 212, the phase error signal coupled is equal to $-\alpha E_{K,Q}S_{K,I}$. If none of these three conditions exist, switch 113 remains open and no phase adjustment signal is coupled to signal processor 103. In similar fashion, for the least mean square algorithm, logic circuit 114 could operate in a substantially identical manner to the foregoing arrangements if the I and Q signals on bus 110 at the $K^{th}$ sampling time replace $S_{K,I}$ and $S_{K,Q}$.

Correct regeneration of the information carried by signals I and Q require that they be sampled at the appropriate time. Timing recovery circuit 304 provides these sampling times in response to signals on bus 111 from incremental alteration circuit 112. With the zero forcing algorithm, changes in the pahse of the sampling time signal at the $K^{th}$ adjustment time, where K is any integer, can be expressed as:

$$\text{Timing phase adjustment} = \alpha[E_K(S_{K+1} - S_{K-1})]; \quad (4)$$

where

α is a predetermined scaling factor;

$E_K$ is the error signal associated with a preselected one of the I and Q signals; and $S_{K+1}$ and $S_{K-1}$ respectively are the value on bus 107 of the preselected one of the I and Q signals at one adjustment time after and one adjustment before the $K^{th}$ adjustment time.

With equation (4), logic circuit 114 of FIG. 1 closes switch 113 only when $E_K$ lies in regions 208 or 215 or when $E_K$ meets this criteria and $S_{K+1}$ and $S_{K-1}$ each lie outside of regions 211 and 212. As before, similar timing adjustments can be made using a least mean square variant by merely substituting the preselected I or Q signal on bus 110 at the K−1 and K+1 adjustment times for $S_{K-1}$ and $S_{K+1}$, respectively.

Figure 5:
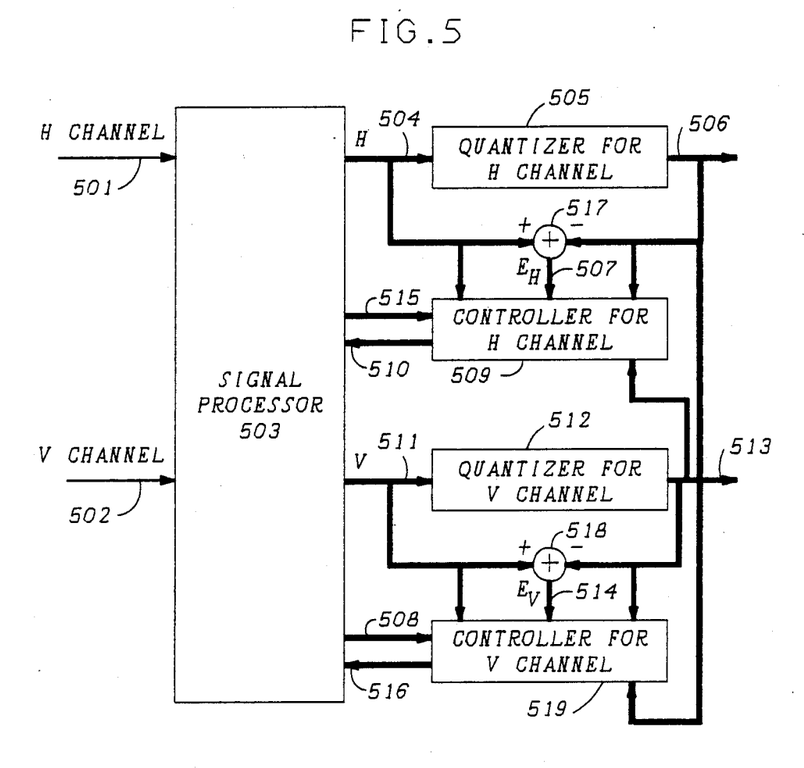
FIG. 5 is a schematic-block diagram of another illustrative decision-directed control circuit in accordance with the present invention.

Refer now to FIG. 5. The present invention can also be used to adjust adaptive circuitry in communications systems receiving amplitude modulated quadrature-related carrier signals which are transmitted on two orthogonal channels designated as H and V. Leads 501 and 502 respectively couple the H and V channel signals to signal processor 503. Quantizers 505 and 512 each provide the same function as quantizer 104 in FIG. 1 and respectively generate complex-valued output signals on buses 506 and 513 which are coupled to other well-known processing circuitry (not shown). Similarly, summers 517 and 518 each form a complex-valued error signal, respectively designated as $E_H$ and $E_V$, in the same manner as summer 104 of FIG. 1.

The error signal $E_H$ formed by summer 517 appears on bus 507 and the error signal $E_V$ formed by summer 518 appears on bus 514. Controller 509 generates control signals on bus 510 which are generated in response to the signals on buses 504, 506, 507, 513 and 515 where the signals used depend on the algorithm (e.g., least mean square or zero forcing). These control signals are used to update certain adaptive circuitry in signal processor 503. In similar fashion, controller 519 produces control signals on bus 516 which update other circuitry in signal processor 503. These control signals are generated in response to the signals on buses 506, 508, 511, 513 and 514, where the signals used vary with the algorithm. Each of these controllers have the same structure as controller 102 of FIG. 1. Buses 508 and 515 respectively couple the input signals to the adaptive circuitry associated with the H and V channels to controllers 519 and 509.

Figure 6:
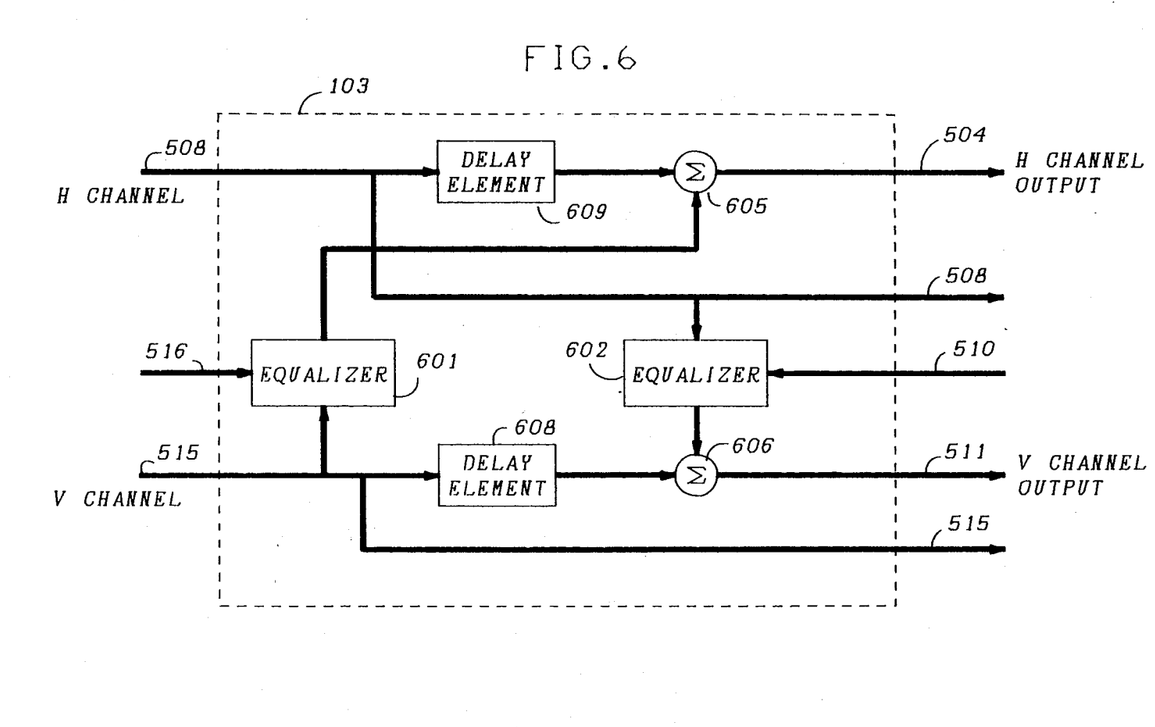
FIG. 6 is a schematic diagram of an arrangement of signal processor 503 of FIG. 5 which includes a cross-polarization canceller.

FIG. 6 shows a cross polarization canceller disposed within signal processor 503. This canceller includes two adaptive transversal equalizers 601 and 602. Each of these equalizers is identical in structure to equalizer 300 in FIG. 3. Buses 508 and 515 respectively couple signals derived from the H and V channel signal on leads 501 and 502. The signal on bus 508 includes the H channel signal and an interfering signal coupled from the V channel while the signal on bus 515 includes the V channel signal and an interfering signal from the H channel.

Equalizer 601 provides a replica of the interfering V channel signal on bus 508 so that when the output of equalizer 601 is added to the signal on bus 508 via summer 605, the interfering V channel signal is eliminated. Delay element 609 provides a delay equal to the signal propagation time through equalizer 601.

Equalizer 602 operates in a manner identical to that of equalizer 601 to provide a replica of the interfering H channel signal on bus 515. Consequently, when the output of equalizer 602 is added to the signal on bus 515 using summer 606, the interfering H channel signal is eliminated. Delay element 608 is provided to compensate for the signal propagation time through equalizer 602.

The tap-weight coefficients of equalizers 601 and 602 can be respectively adjusted via control signals on buses 510 and 516 which are each generated using well-known algorithms, such as least mean square or zero forcing. In accordance with the present invention, the control signals for each equalizer are only supplied when one or more conditions are present. These conditions vary with the algorithm used and are analogous as those specified for equalicer 300.

It should, of course, be understood that while the present invention has been disclosed in reference to specific embodiments other arrangements should be apparent to those skilled in the art. First, for example, by examining the appropriate signals in the controller of FIGS. 1 or 5, any combination of the disclosed adaptive circuitry, including other well-known adaptive receiver circuits, can be controlled using virtually any decision-directed algorithm in accordance with the present invention. Second, the present invention can be utilized with a variety of different modulation formats which convey information on a plurality of digital signal levels. Thirdly, while the incremental alterations circuitry of FIGS. 1 and 5 are disclosed as being in continuous operation, such circuitry can be selectively actuated by the disclosed logic circuit so that switch 113 is eliminated. Fourthly, while the disclosed embodiments supply incremental control signals to various adaptive circuits in the signal processor, alternatively, the full value of the control signal could be supplied. Finally, the terms communications system and signal receiver encompass any system or apparatus receiving information, including robotics systems wherein visual or positional information is processed.

What is claimed is:

1. Decision-directed control apparatus for use in a communications signal receiver wherein each received signal conveys information on a plurality of discrete signal levels, said apparatus comprising
   adjustable means for processing each received signal to form an associated first output signal;
   means for determining when the amplitude of each first output signal in a predetermined group, comprising at least one preselected first output signal, lies outside of a range extending from a largest to a smallest of said signal levels; and
   means responsive to said determining means for supplying adjustments to said processing means if the amplitude of each first output signal in said group lies outside of said range and supplying no adjustments if the amplitude of each first output signal in said group lies within said range, said adjustments altering the signal processing provided by said processing means.

2. The apparatus of claim 1 wherein said determining means determines when the amplitude of each first output signal in said group lies outside an associated subset of said range and supplies this determination to said supplying means.

3. The apparatus of claim 2 wherein said supplying means supplies adjustments if the amplitude of each first output signal in said group lies outside of said range at first times and the amplitude of each first output signal in said group lies outside said subset at second times.

4. The apparatus of claim 1 wherein said supplying means supplies adjustments formed in accordance with a least mean square algorithm.

5. The apparatus of claim 1 wherein said supplying means supplies adjustments formed in accordance with a zero forcing algorithm.

6. The apparatus of claim 1 wherein said processing means delivers a second output signal associated with each received signal to said determining means.

7. The apparatus of claim 6 wherein said determining means determines when the amplitude of each second output signal in said predetermined group, comprising at least one second output signal, lies outside an associated subset of said range and supplies this determination to said supplying means.

8. The apparatus of claim 7 wherein said supplying means supplies adjustments to said processing means if the amplitude of each first output signal in said predetermined group lies outside said range at first times and the amplitude of each second output signal in said predetermined group lies outside said subset at second times.

9. The apparatus of claim 1 wherein said processing means includes a transversal equalizer which is supplied with adjustments by said supplying means.

10. The apparatus of claim 1 wherein said processing means includes a cross polarization canceller which is supplied with adjustments by said supplying means.

11. The apparatus of claim 1 wherein said processing means includes a timing recovery circuit which is supplied with adjustments by said supplying means.

12. The apparatus of claim 1 wherein said processing means includes a carrier recovery circuit which is supplied with adjustments by said supplying means.

13. The apparatus of claim 1 wherein each first output signal in said predetermined group varies with the signal processing adjustments.

14. The apparatus of claim 7 wherein each second output signal in said predetermined group varies with the signal processing adjustments.

15. A method of adjusting decision-directed apparatus for use in a communications signal receiver wherein each received signal coveys information on a plurality of discrete signal levels, said method comprising the steps of
   processing each received signal to form an associated first output signal;
   determining when the amplitude of each first output signal in a predetermined group, comprising at least one first output signal, lies outside of a range extending from a largest to a smallest of said signal levels; and
   supplying adjustments which alter the processing provided to said received signal by said processing step if the amplitude of each first output signal in said group lies outside of said range and supplying no adjustments to said processing step if the amplitude of each first output signal in said group lies within said range.

16. The method of claim 15 further comprising the steps of
   determining when the amplitude of each first output signal in said group lies outside an associated subset of said range and supplying this determination to said supplying step.

17. The method of claim 16 wherein said supplying step supplies adjustments which alter the processing provided to said received signal by said processing step if the amplitude of each first output signal in said group lies outside of said range at first times and the amplitude of each first output second in said group lies outside of said subset at second times.

18. The method of claim 15 wherein said supplying step supplies adjustments formed in accordance with a least mean square algorithm.

19. The method of claim 15 wherein said supplying step supplies adjustments formed in accordance with a zero forcing algorithm.

20. The method of claim 15 wherein said processing step provides a second output siganl associated with each received signal to said determining step.

21. The method of claim 20 wherein said determining step determines when the amplitude of each second output signal in said predetermined group, comprising at least one second output signal, lies outside an associated subset of said range and supplies this determination to said supplying step.

22. The method of claim 21 wherein said supplying step supplies adjustments which alter the processing provided to said received signal by said processing step if the amplitude of each first output signal in said predetermined group lies outside said range at first times and the amplitude of each second output signal in said predetermined group lies outside said subset at second times.

23. The method of claim 15 wherein said processing of said received signal utilizes a transversal equalizer which is supplied with adjustments by said supplying step.

24. The method of claim 15 wherein said processing of said received signal includes a cross polarization canceller which is supplied with adjustments by said supplying step.

25. The method of claim 15 wherein said processing of said received signal includes a timing recovery circuit which is supplied with adjustments by said supplying step.

26. The method of claim 15 wherein said processing of said received signal includes a carrier recovery circuit which is supplied with adjsutments by said supplying step.

27. The method of claim 15 wherein each first output signal in said predetermined group varies with the adjustments provided to said processing step.

28. The method of claim 21 wherein each second output signal in said predetermined group varies with the adjustments provided to said processing step.

* * * * *